United States Patent [19]

Botros

[11] 4,097,231
[45] Jun. 27, 1978

[54] METAL-CONTAINING POLYPROPYLENE DYED WITH MONOAZO 1-ARYL-3-ALKYL-5-PYRAZOLONES

[75] Inventor: Raouf Botros, Beech Creek, Pa.

[73] Assignee: American Color & Chemical Corporation, Charlotte, N.C.

[21] Appl. No.: 780,405

[22] Filed: Mar. 23, 1977

[51] Int. Cl.² .................. C09B 27/00; C09B 45/00
[52] U.S. Cl. .................. 8/41 D; 8/42 D; 8/180; 260/147
[58] Field of Search ............... 8/41 D, 42 D, 180

[56] References Cited

U.S. PATENT DOCUMENTS

| | | | |
|---|---|---|---|
| 2,908,677 | 10/1959 | Straley et al. | 260/147 |
| 3,419,342 | 12/1968 | Matlack | 8/46 |

OTHER PUBLICATIONS

Hartley, P. N., International Dyer, 1965, vol. 134, pp. 541–543.
Moncrieff, "Man-Made Fibres," 6th Edition, (John Wiley, 1975), pp. 615–619.

*Primary Examiner*—A. Lionel Clingman
*Attorney, Agent, or Firm*—Armstrong, Nikaido, Marmelstein & Kubovcik

[57] ABSTRACT

Metal-containing polypropylene fibers dyed with monoazo 1-aryl-3-alkyl-5-pyrazolone compounds of the structure:

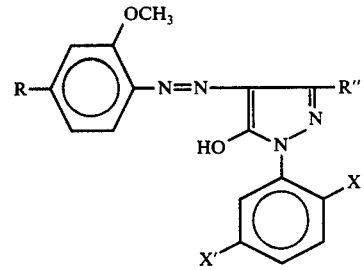

where
R is hydrogen or lower alkoxy,
R" is lower alkyl,
X is hydrogen or halogen, and
X' is hydrogen or halogen are provided. The dyed metal-containing polypropylene fibers have bright yellowish hues of outstanding crock fastness, light fastness and fastness to dry cleaning solvents.

5 Claims, No Drawings

METAL-CONTAINING POLYPROPYLENE DYED WITH MONOAZO 1-ARYL-3-ALKYL-5-PYRAZOLONES

BACKGROUND OF THE INVENTION

1. Field of the Invention

The present invention relates to dyed nickel-containing polypropylene fibers. More particularly, the invention relates to nickel-containing polypropylene fibers dyed with monoazo 1-aryl-3-alkyl-5-pyrazolones in bright yellow shades of superior fastness to light and dry cleaning solvents. The invention has outstanding utility in the production of polypropylene carpets.

2. Description of the Prior Art

Polypropylene, because of its excellent mechanical strength, high elasticity and resistance to solvents, has found increased utility in recent years as filaments, yarns, fabrics, ropes and the like. Commercially available polypropylene materials generally contain metals or metal salts or chelates to provide stability against degradation due to light. These metals or metal salts or chelates also serve to provide reactive sites for dyes.

Dyes (typically chelatable dyes) having specific utility in the dyeing of such metal-containing, or metal-modified, polypropylene are reported extensively in the literature. Notwithstanding such disclosure, however, there is a continuing need, particularly in the carpet industry, for dyes which will dye metal-containing polypropylene fibers in bright aesthetic shades of outstanding fastness characteristics.

Straley et al, U.S. Pat. No. 2,908,677, discloses the metallized form of monoazo 1-aryl-5-pyrazolones of the formula

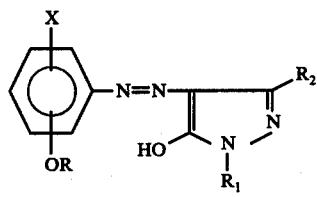

where
X is defined as including hydrogen and methoxy,
R is defined as including methyl and ethyl,
$R_1$ is defined as including phenyl and chlorophenyl, and
$R_2$ is defined as including methyl.

The dyes are disclosed as being particularly effective in the coloring of cellylose acetate textile materials to improve fastness to washing.

According to the patent, the cellulose acetate is dyed with the non-metallized azo compounds and then treated with a metal salt to cause the azo compound to form metal complexes. The metallizing agents disclosed are the halides, the sulfates, the acetates, the cyanides and the thiocyanates of metals including nickel.

It is not predictable, however, based on the findings of Straley et al that certain of the azo compounds generically disclosed therein will provide dyeings on metal-containing polypropylene fibers of outstanding fastness to crocking, light and dry cleaning solvents. This unpredictability is based on the difference in fiber structure between cellulose acetate and polypropylene fibers and the difference in metallizing agents. For example, it is disclosed in U.S. Pat. No. 3,419,342 that nickel complexes of the formula:

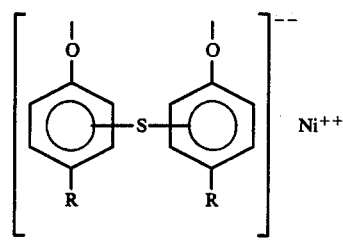

(R being alkyl of 1-20 carbons)
are incorporated in polypropylene fiber to provide sites for chelating.

SUMMARY OF THE INVENTION

According to the present invention, metal-containing; particularly, nickel-containing, polypropylene textile fibers are dyed in bright yellow shades with a monoazo 1-aryl-3-alkyl-5-pyrazolone compound of the formula (I):

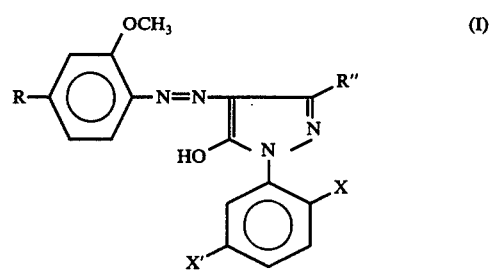

where
R is hydrogen or alkoxy of 1-4 carbons,
R" is alkyl of 1-4 carbons,
X is hydrogen, chloro or bromo, and
X' is hydrogen, chloro or bromo.

DESCRIPTION OF PREFERRED EMBODIMENTS

The monoazo 1-aryl-3-alkyl-5-pyrazolone compounds of the formula (I) are obtained by diazotizing an appropriate aromatic amine and coupling into a selected 1-aryl-3-alkyl-5-pyrazolone.

Aromatic amines suitable as the base for the monoazo compounds (I) include ortho-anisidine; 2,4-dimethoxyaniline; 2-methoxy-4-ethoxyaniline and the like.

As the coupler for the monoazo compounds (I) there may be employed, for example, 1-phenyl-3-methyl-5-pyrazolone; 1-(o-chlorophenyl)-3-methyl-5-pyrazolone and 3-methyl-1-(2,5-dichlorophenyl)-5-pyrazolone.

The azo compound prepared by diazotizing 2,4-dimethoxyaniline and coupling into 1-(o-chlorophenyl)1-3-methyl-5-pyrazolone were found to provide dyed nickel-containing polypropylene fibers which exhibited no crocking after any of the conventional tests, i.e., extended storage or thermal, no bleeding upon treatment with perchloroethylene and no shade change with heat. The dyeings were also gas fast and showed no break in light fastness after 8L4 units.

Diazotization of the aromatic amine and coupling of the diazotized amine into the pyrazolone are carried out in conventional ways. Diazotization of the aromatic amine is effected by heating it (if necessary to achieve solution) in an aqueous solution of strong mineral acid such as hydrochloric acid, cooling the resulting solution to a temperature of 0° – 10° C, and adding thereto a quantity of sodium nitrite slightly in excess of the stoichiometric requirement. An alternate method of diazotization involves dissolving sodium nitrite in concentrated sulfuric acid, heating to a temperature of about 60° – 70° C, cooling the resulting solution to 0° – 10° C and adding thereto the aromatic amine.

The coupling reaction is carried out by adding the diazonium salt to a cold aqueous alkaline solution of the respective coupler. The mixture is allowed to react until the coupling is essentially complete, usually in 1 – 24 hours at 0° C to room temperature and is thereafter filtered and washed with water or water containing dissolved sodium chloride. The product may be reslurried in water which is then made acidic to Congo Red paper with hydrochloric or other acid. The mixture is filtered and the cake is washed neutral with water. The desired azo product is thus obtained in the form of a moist cake. The product may be used in this form or it may be dried before grinding with a suitable agent to form a disperse paste or powder as described below.

To prepare the monoazo 1-aryl-3-alkyl-5-pyrazolone compound (I) for application to the metal-modified fiber substrates, it must be suitably dispersed. This may be done by any of several well-known methods, e.g., milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additional dispersant for powders, or water for pastes. Other materials such as preservatives, foam-control agents, and wetting agents (for powders) may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethane disulfonate, are conveniently used. The disperse paste may be cut or standardized to a standard strength with water. The final color content of the finished paste is usually from 5 – 40 percent by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as the same or another dispersant or dextrin. A wetting agent, such as sodium cetyl sulfate or an alkylaryl polyether alcohol may be added to aid in wetting out the product when it is placed in the dye bath. Disperse powders are usually cut or standardized to 10 – 50 percent by weight color content (pure color).

The resulting disperse dyes may be applied to the metal-containing polypropylene fibers in a manner conventional in the dyeing of disperse dyestuffs and may be applied, for example, as neutral, acidic, or alkaline aqueous suspensions, with the use of dispersing agents, from a dyebath, preferably at temperatures of from 50° C to 105° C. When temperatures of less than about 100° C are employed it is sometimes advantageous to add a customary carrier substance. These dyes can also be applied to the metal-containing polypropylene fabrics by a printing process. The printing paste can be thickened with customary thickening agents and may also contain other additives conventionally used with printing pastes. The printing paste is expediently applied to the fabric by a printing block or a roller, after which the printed fabric is dried and steamed at a temperature between 105° C and 110° C. After the dyeing or printing of the polypropylene material, it is treated with a hot aqueous soap solution, rinsed and dried. As suitable dyeing and printing techniques there may be mentioned those described in U.S. Pat. Nos. 3,399,027; 3,399,952; 3,492,078; 3,556,709; and 3,360,656.

Nickel-containing polypropylene fiber materials are typically employed as the metal-containing polypropylene fibers according to the present invention. It is believed, however, that any of the conventionally produced polypropylene materials generally designated in the textile art as "polypropylene fibers," which contain Werner Complex forming metal, i.e., chromium, cobalt, nickel, aluminum or zinc either as such or in the form of its salts or chelates dyed with the particular 1-aryl-5-pyrazolone dyes according to the present invention will possess the outstanding fastness properties. The exact metal content of the metal-containing polypropylene fibers is not generally specified by the manufacturer, but is believed to vary within the range of about 0.1 to about 2.0 weight percent. The metal improves the dyeing properties of the fiber materials and also serves to stabilize the materials against degradation due to light and heat. Nickel-containing polypropylene materials are available commercially, for example, under the trademark HERCULON.

The invention may be better understood by referring to the examples set forth below. In the examples, the properties of dyed or printed polypropylene were evaluated according to the following tests:

Test No. 1: (Crocking) A crock test on an air dried sample, i.e., a portion of printed or dyed fiber, fabric or carpet construction, is conducted in accordance with AATCC Test Method 8-1972, page 112 of the 1974 Technical Manual of AATCC.

Test No. 2: (Heat stability) A heat stability test determined by subjecting an air dried sample to a heat treatment of 250° F for 20 minutes. The heat treated sample is compared to an air dried sample with respect to shade change.

Test No. 3: (Crocking) The sample from Test No. 2 is tested for crocking according to the procedure of Test No. 1. There should be no change in crocking.

Test No. 4: (Light fastness) A practical strength of a dyed or printed air dried sample is exposed to a Xenon arc lamp (AATCC Test Method 16E-1974, page 133 of the 1974 Technical Manual of the AATCC). A range of 3L4 to 4L4 exposures are the lower limit of desirability in the carpet trade.

Test No. 5: (Dry cleaning) An air dried sample is tested for color fastness to dry cleaning in accordance with AATCC Test Method No. 132-1973, page 117 of the 1974 Technical Manual of the AATCC.

EXAMPLE I

A. Preparation of the Azo Compound

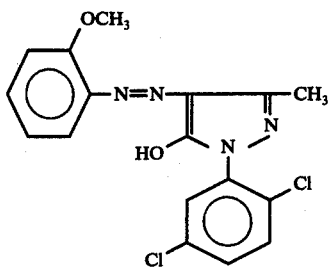

(M.W. 377)

A mixture of 18.5 g o-anisidine, 60 g 32% hydrochloric acid and 300 ml water was diazotized at 0° C with a solution of 10.5 g sodium nitrite dissolved in 100 ml water. The clear diazo solution was added at 0° C during ½ hour to a solution of 36.5 g 1-(2,5-dichlorophenyl)-3-methyl-5-pyrazolone in 500 ml water which contained 12 g 50% aqueous sodium hydroxide and 43 g sodium acetate. Coupling was very rapid. The reaction mixture was filtered and the cake was washed neutral with water. The product was then reslurried in water and was made acidic to Congo Red paper with hydrochloric acid. The mass was filtered and the cake was washed neutral with water.

Yield: 179.1 g wet cake; 30% dry test = 53.7 g 100% dry (94.8% of theory)

170 g of the wet cake (30% dry test) was charged to a sandmill with 38.5 g Lignosol FTA (a ligninsulfonic acid dispersant), 38.5 g Lignosol D-10 and 263 ml water. The mixture was sandmilled until dispersion test was satisfactory.

Yield: 510 g 10% Color Content Paste

B. Dyeing of a Ni-Containing Polypropylene with a Printing Paste

Nickel-containing polypropylene fibers may be dyed with a printing paste of the dye of I(A) in the following manner. A printing paste is prepared with 1000 parts of Tragacanth gum thickener (polysaccharides of galactose, fructose, xylose and arabinose with glucuronic acid), 5 parts acetic acid and a quantity of dispersed dyestuff corresponding to 5 to 10 parts of a pure dyestuff as obtained in Example I(B). A fabric made of fibers of polypropylene containing nickel is printed on a roller. The fabric is dried and steamed for 8 minutes at 105° - 110° C. The fabric is then vigorously washed in a bath of soap at 90° C. Polypropylene fabric printed in a manner as described above using the dye I(A) was dyed in strong brilliant greenish yellow shades which possessed outstanding fastness to light (8L4 units). Fastness to crocking and dry cleaning solvents was rated excellent.

C. Dyeing of a Ni-Containing Polypropylene from a Dyebath

Nickel-containing polypropylene is typically dyed from a dyebath with the dye of I(A) in the following manner. Piece goods of "HERCULON TYPE 40" an isotactic polypropylene containing a bis(p-alkylphenol) mono sulfide nickel compound (believed to be in an amount of 0.12% calculated as metallic nickel by weight based on the weight of the polypropylene) are placed in a bath set at 35° C containing 1% Triton X-100 (iso-octyl-phenyl polyethoxy ethanol), based on weight of fiber, 1 - 1.5% acetic acid (pH3-4) and a 1% (on weight of fiber) dispersion of the dye from Example I(A). After 5 minutes the temperature is raised to 95° C over a 30 minute period. The dyeing is continued at 95° C for an additional 45 minutes. The piece goods are removed from the dye bath, rinsed and soaped in 0.5% soap solution at 90° C for 10 minutes and are then rinsed with water and dried.

Similar results were obtained as described in I(B) when nickel-containing polypropylene fibers were dyed from a dye bath with the dye of I(A).

EXAMPLE II

Preparation of the Azo Compound

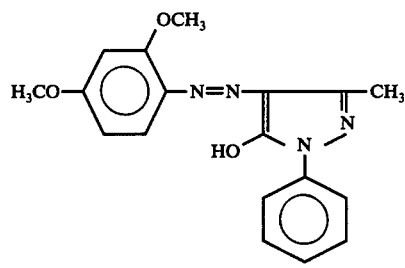

(M.W. 338)

A mixture of 23 g 2,4-dimethoxyaniline, 60 g 32% hydrochloric acid and 200 ml water was diazotized at 0° C with a solution of 10.5g sodium nitrite dissolved in 50 ml water. The clear dizao solution was added at 0° C during ½ hour to a solution of 26.1 g 1-phenyl-3-methyl-5-pyrazolone in 500 ml water which contained 16 g 50% aqueous sodium hydroxide and 45 g sodium acetate. Coupling was very rapid. The reaction mixture was filtered and the cake was washed neutral with water. The product was then reslurried in water and was made acidic to Congo Red paper with hydrochloric acid. The mass was filtered and the cake was washed neutral with water.

Yield: 225.7 g wet cake; 22% dry test = 49.7 g 100% dry (98% of theory)

220 g of the wet cake (22% dry test) was charged to a sandmill with 72.6 g Lignosol FTA and 191.4 g water. The mixture was sandmilled until dispersion test was satisfactory.

Yield: 484 g 10% Color Content Paste

The dispersed product, when printed on nickel-containing polypropylene by a procedure as described in Example I(B) produced brilliant golden yellow shades of excellent color value. The light fastness was rated at 8L4 units which is considered to be outstanding. The prints showed good crock fastness and very good resistance to dry cleaning solvents.

EXAMPLE III

Preparation of the Azo Compound

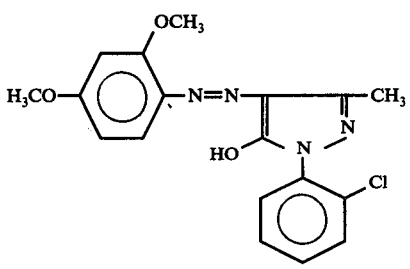

(M.W. 372.5) 15.3 g 2,4-dimethoxyaniline was diazotized in accordance with the method of operation described in Example II. The clear diazo solution was coupled with a solution of 21 g 1-(o-chlorophenyl)-3-methyl-5-pyrazolone in 200 ml water which contained 16 g 50% aqueous sodium hydroxide solution and 21.2 g sodium carbonate. After coupling was complete, the mixture was filtered and the cake was washed neutral with water.

Yield: 176.2 g wet cake; 19% dry test = 33.4 g 100% dry (89% of theory)

160 g of the wet cake (19% dry test) was charged to a sandmill with 30.4 g Lignosol FTA and 113.6 g water. The mixture was sandmilled until dispersion test was satisfactory.

Yield: 304 g 10% Color Content Paste

The dispersed product, when applied to nickel-containing polypropylene by a printing method, produced brilliant golden yellow shades with outstanding all around fastness properties. The dyeings showed no break in light fastness after 8L4 units. Fastness to crocking, gas, dry cleaning solvents and shade change with heat were rated excellent.

COMPARISON EXAMPLE I

The Compound

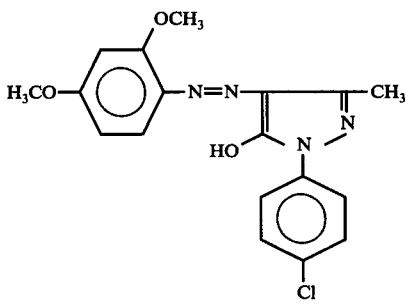

(M.W. 372.5)

was prepared by diazotizing 15.3 g 2,4-dimethoxyaniline as described in Example II. The diazo solution was coupled with 20.9 g 1-(p-chlorophenyl)-3-methyl-5-pyrazolone dissolved in 500 ml water which contained 11 g 50% aqueous sodium hydroxide and 45 g sodium acetate. The coupled mixture was filtered, and the cake was washed neutral with water.

Yield: 241 g wet cake; 16% dry test = 38.5 g 100% dry 234 g of the wet cake (16% dry test) was charged to a sandmill with 56.2 g Lignosol FTA and 84.2 g water. The mixture was sandmilled until dispersion test was satisfactory.

Yield: 374.4 g 10% Color Content Paste

The dispersed dye when printed on nickel-containing polypropylene produced dull reddish yellow shades much weaker than the dyeings of Example III when printed at equal concentrations. The color value was rated poor to fair.

COMPARISON EXAMPLE II

The Compound

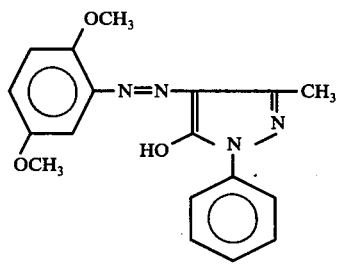

(M.W. 338)

was prepared by diazotizing a mixture of 15.3 g 2,5-dimethoxyaniline, 40 g 32% hydrochloric acid and 200 ml water at 0° C with a solution of 7.2 g sodium nitrite dissolved in 50 ml water. The clear diazo solution was added in a thin stream at 0° C to a solution of 17.4 g 1-phenyl-3-methyl-5-pyrazolone dissolved in 500 ml water which contained 11 g 50% aqueous sodium hydroxide and 45 g sodium acetate. The coupled mixture was filtered and the cake was washed neutral with water.

Yield: 36 g 100% dry 36 g of the above product was charged to a sandmill with 54 g Lignosol FTA and 270 g water. The mixture was sandmilled until dispersion test was satisfactory.

Yield: 360 g 10% Color Content Paste

The dispersed product dyed nickel-containing polypropylene in weak reddish yellow shades. At equal concentrations, the dyeings were found to be much weaker than those obtained by using the dye of Example II.

What is claimed is:

1. Dyed metal-containing polypropylene fibers, the dye being of the structure:

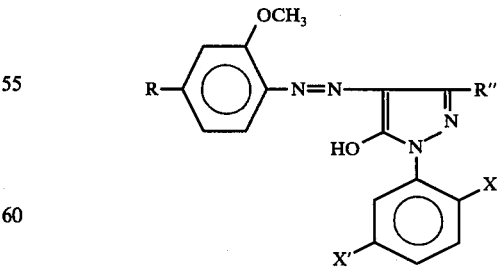

where
R is H or alkoxy of 1–4 carbons,
R" is alkyl of 1–4 carbons,
X is H, chloro or bromo, and
X' is H, chloro or bromo;

and the metal of said metal-containing polypropylene fibers being selected from the group consisting of chromium, cobalt, nickel, aluminum and zinc.

2. The dyed metal-containing polypropylene fibers of claim 1, wherein the metal-containing polypropylene is nickel-containing polypropylene.

3. The dyed nickel-containing polypropylene fibers of claim 2 wherein R is H, R" is $CH_3$, X is chloro and X' is chloro.

4. The dyed nickel-containing polypropylene fibers of claim 2 wherein R is $OCH_3$, R" is $CH_3$, X is chloro and X' is H.

5. The dyed nickel-containing polypropylene fibers of claim 2 wherein R is $OCH_3$, R" is $CH_3$, X is H and X' is H.

* * * * *